United States Patent [19]

Irie et al.

[11] Patent Number: 5,088,101
[45] Date of Patent: Feb. 11, 1992

[54] LASER GAS DISPLACEMENT AMOUNT CONTROL METHOD

[75] Inventors: Michiaki Irie; Nobuaki Iehisa, both of Yamanashi; Etsuo Yamazaki, Hachioji, all of Japan

[73] Assignee: Fanuc Ltd., Minamitsuru, Japan

[21] Appl. No.: 476,432

[22] PCT Filed: Sep. 29, 1989

[86] PCT. No.: PCT/JP89/00999
§ 371 Date: May 30, 1990
§ 102(e) Date: May 30, 1990

[87] PCT Pub. No.: WO90/04273
PCT Pub. Date: Apr. 19, 1990

[30] Foreign Application Priority Data

Oct. 7, 1988 [JP] Japan ................................ 63-253229

[51] Int. Cl.$^5$ ................................................ H01S 3/22
[52] U.S. Cl. .................................................... 372/59
[58] Field of Search ............................. 372/58, 59, 61

[56] References Cited

U.S. PATENT DOCUMENTS

| | | | |
|---|---|---|---|
| 4,592,063 | 5/1986 | Accetta et al. | 372/58 |
| 4,794,613 | 12/1988 | Nilsen et al. | 372/58 |
| 4,937,837 | 6/1990 | Iehisa | 372/58 |

Primary Examiner—Leon Scott, Jr.
Attorney, Agent, or Firm—Staas & Halsey

[57] ABSTRACT

A laser gas displacement amount control method for controlling the amount of displacement of a laser gas in a discharge pumping type gas laser device. The laser gas in a discharge tube is displaced with a predetermined displacement amount during a fixed period immediately after starting during which a beam-output correction is effected, and the laser gas is displaced with a displacement amount smaller than the predetermined displacement amount during the operation period thereafter. Since this smaller displacement amount can be made less than one-tenth of the predetermined displacement amount required during the fixed period immediately after starting, the amount of consumption of the laser gas can be reduced.

2 Claims, 2 Drawing Sheets

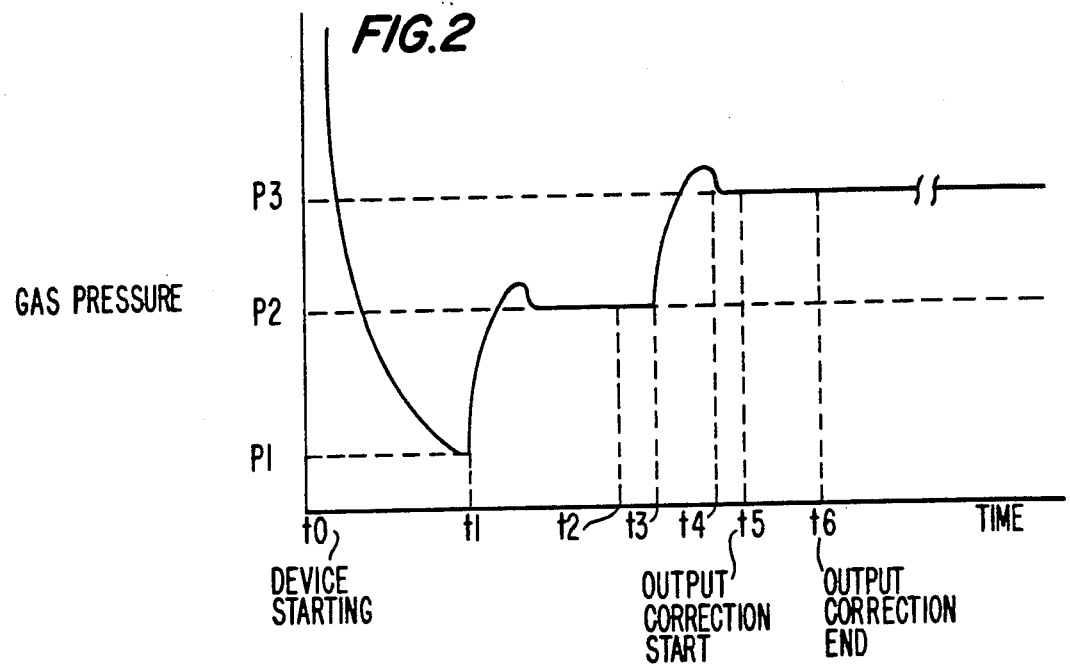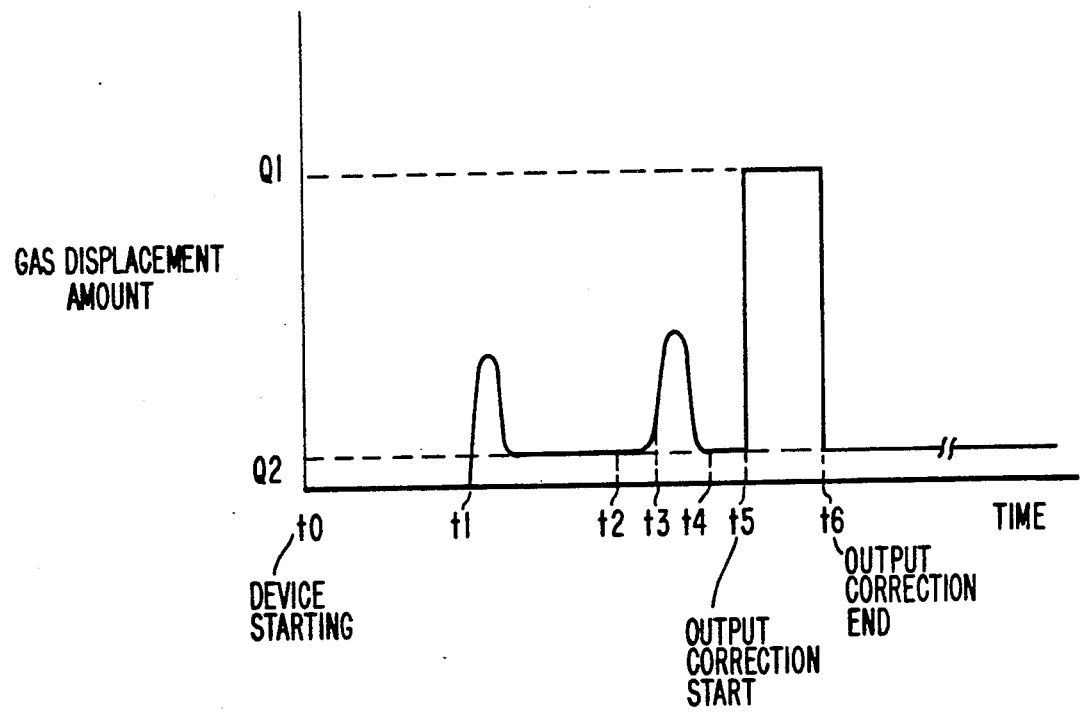

LASER GAS DISPLACEMENT AMOUNT CONTROL METHOD

TECHNICAL FIELD

The present invention relates to a laser gas displacement amount control method for controlling the amount of displacement of a laser gas in a discharge pumping type gas laser device, and more particularly, to a laser gas displacement amount control method permitting a reduction in the amount of consumption of the laser gas.

BACKGROUND ART

In a discharge pumping type gas laser device, some atmospheric air seeps into the blast system when the device is not operating, and therefore, after starting, the laser gas must be displaced by not less than a predetermined amount of fresh gas. If this operation is not performed, usually the control characteristic of the laser output is adversely affected. More specifically, the first transition of an actual laser output for a step command value is delayed.

Accordingly, the laser gas is displaced by this predetermined amount, which is kept at a constant value from the start to the end of the operation.

If the operation is continued for a predetermined period, however, most unnecessary components introduced therein during the non-operating state are exhausted to the outside, so that the control characteristic of the laser output cannot be lowered without displacing the amount required immediately after the start, and thus it is pointless to keep the displacement amount at a constant value during the period from the start to the end of operation.

DISCLOSURE OF THE INVENTION

It is an object of the present invention has been contrived in consideration of these circumstances, and thereof is to provide a laser gas displacement amount control method by which a reduction in the amount of consumption of the laser gas is obtained.

To solve the above problem, according to the present invention, there is provided a laser gas displacement amount control method for controlling the amount of displacement of a laser gas in a discharge pumping type gas laser device. In the laser gas displacement amount control method, the laser gas is displaced by a predetermined displacement amount during a fixed period immediately after starting. The laser gas is displaced by a displacement amount smaller than the predetermined displacement amount during the operation period after the lapse of the fixed period immediately after starting.

During the fixed period immediately after starting, the displacement is rapidly effected with a large displacement amount, to remove unnecessary components introduced therein during the non-operating state. In the operation period after the end of the fixed period, the displacement amount is limited to the minimum amount required only for replacement of laser gas deteriorated by the electric discharge. Since this displacement amount can be made less than one-tenth of the displacement amount required during the fixed period immediately after starting, the amount of consumption of the laser gas can be reduced.

BRIEF DESCRIPTION OF THE DRAWINGS

FIG. 2 is a graph showing time-dependent changes of the gas pressure in a blast system; and FIG. 3 is a graph showing time-dependent changes of gas displacement amount based on the laser gas displacement amount control method according to an embodiment of the present invention.

BEST MODE OF CARRYING OUT THE INVENTION

Figure 1:
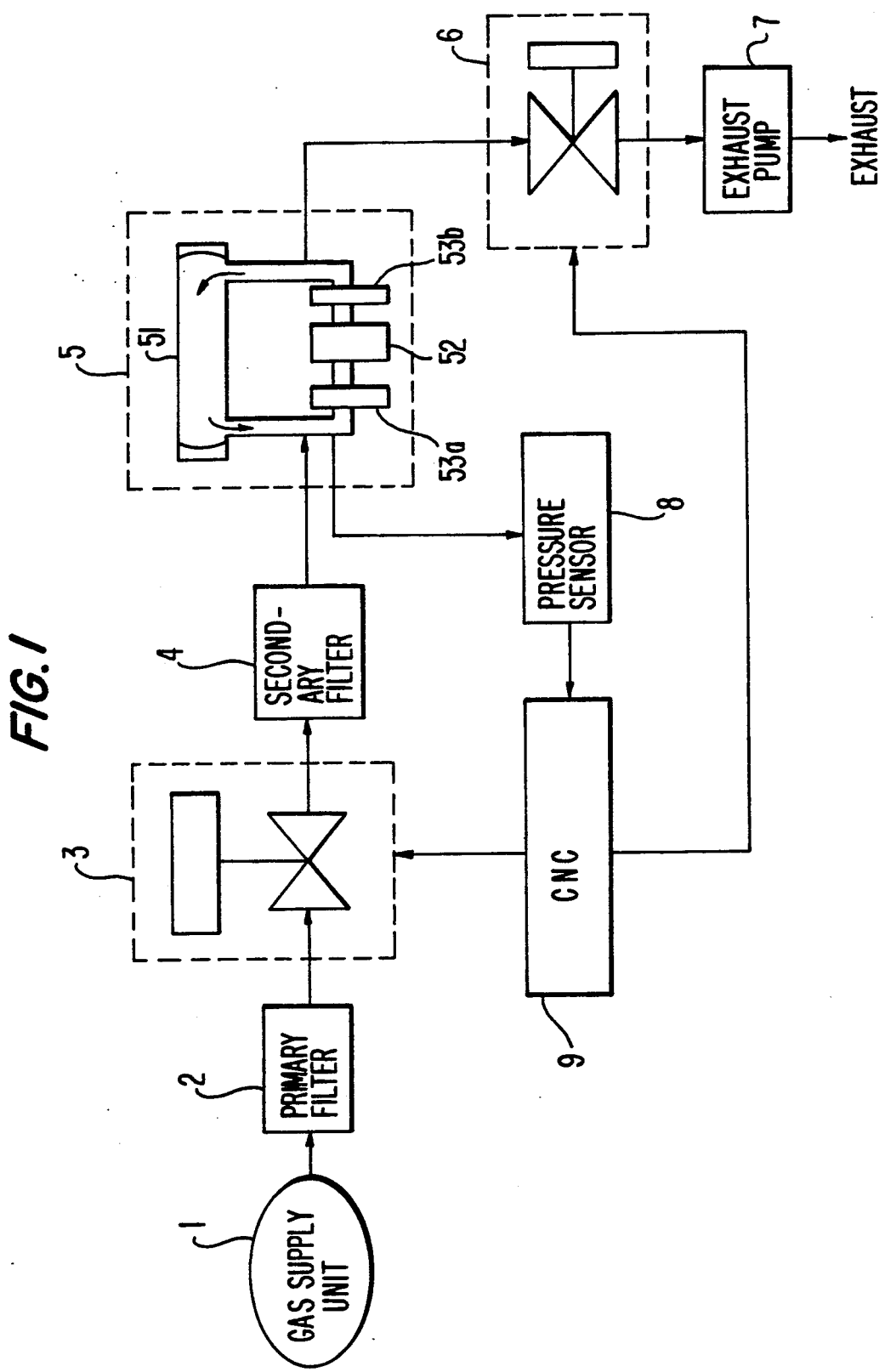
FIG. 1 is a block diagram of a gas control system for effecting the laser gas displacement amount control method according to the present invention.

An embodiment of the present invention will now be described with reference to the drawings.

FIG. 1 is a block diagram of a gas control system in a gas laser device to which the present invention is applied. In FIG. 1, numeral 1 denotes a gas supply unit, e.g., a gas cylinder under a pressure of 1 to 2 kgf/cm$^2$. Numerals 2 and 3 denote a 2-$\mu$m primary filter for gas cleaning and a supply valve, respectively, and numeral 4 denotes a 0.5-$\mu$m secondary filter for gas cleaning, which removes dust and the like introduced thereto when the gas passes through a gas pipe and the gas flow control valve 3.

Numeral 5 denotes a blast system, which comprises a discharge tube 51, a blower 52, and cooling units 53a and 53b. The cooling unit 53a is used for cooling a laser gas heated to high temperature by laser oscillation in the discharge tube 51, and the cooling unit 53b is used for removing compression heat generated by the blower 52. A Roots blower or turbo blower is used as the blower 52, which causes the laser gas in the discharge tube 51 to circulate through the cooling units 53a and 53b.

Numeral 6 denotes an exhaust valve for regulating the exhaust flow rate, which exhaust valve 6 is controlled by a numerical control device mentioned later, and numeral 7 denotes an exhaust pump for discharging the laser gas. The exhaust pump 7 exhausts the laser gas in the blast system 5 in a vacuum at the start of operation, and continually discharges and displaces laser gas deteriorated by the introduction of the atmospheric air or by the electric discharge. Numeral 8 denotes a pressure sensor for detecting the laser gas pressure in the blast system 5, and numeral 9 denotes a numerical control device (CNC), which regulates the exhaust valve 6 in accordance with a command value, and controls the absolute flow rate of the laser gas. When receiving a feedback signal from the pressure sensor 8, the CNC 9 immediately regulates the supply valve 3, to thereby adjust the laser gas pressure in the blast system 5 to the command pressure. The displacement of the laser gas is effected after the required adjustments of the opening of both the supply valve 3 and the exhaust valve 6 are completed.

Referring now to FIG. 2, the operation sequence of the aforementioned gas control system will be described. FIG. 2 is a graph showing the time-dependent changes of the laser gas pressure in the blast system 5 in the gas control system of FIG. 1. In FIG. 2, the axes of the abscissa and the ordinate represent the time and the laser gas pressure, respectively.

Symbol t0 designates the time at which the gas laser device is started when the exhaust pump is started. Thereafter, the supply valve is closed and the exhaust valve is opened, so that the laser gas in the blast system is evacuated to the level of a gas pressure P1 (about 10 Torr).

When the evacuation is completed at time t1, the gas pressure is raised to P2 (about 30 Torr), and at time t2, a high-frequency voltage of 2 MHz from a high-frequency power supply is applied to the discharge tube to start electric discharge.

After an electrically discharged state is established, the gas pressure is raised to P3 (about 45 Torr) between the times t3 and t4.

Then between t5 and t6, an output correction is effected as a preliminary stage before a beam is actually delivered to the outside. The details of this output correction will be described later.

When the output correction is completed, the high-frequency current is lowered so that the laser output becomes zero, and a base discharge state is maintained for a stand-by.

The following is a brief description of the output correction. In the gas laser device, secular changes of the distances between individual mirrors and the angles of the mirrors, contamination of the mirrors, and fluctuations in the performance of the high-frequency power supply, etc. occur, so that the relationship between an initially set command value and the actual output is subject to error. To solve this problem, an output correction method disclosed in Japanese Patent Application No. 62-107823 is used.

In this output correction method, the beam is first output at a predetermined command value and monitored before actual machining, the numerical control device coupled to the gas laser device creates a table for comparison between the command value and the actual output, and the laser output is automatically corrected. Thus, the command value need not be changed every time a secular change or the like occurs. Usually, the output correction is completed within several minutes.

FIG. 3 is a graph showing the secular change of gas displacement amount based on the laser gas displacement amount control method of the present invention. In FIG. 3, the axes of the abscissa and the ordinate represent the time and the gas displacement amount, respectively. Symbols t0, t5 and t6, which designate times, correspond respectively to the times designated by like symbols shown in FIG. 2.

After the device is started at time t0, the pressure in the blast system is controlled until the time t5, so that the flow rate changes pulsatively as the pressure changes.

The interval between the times t5 and t6 is used for the output correction, and the beam is not output before this interval after starting. Since some atmospheric air or steam discharged from the inside of the blast system may be mixed with the laser gas in the blast system, the displacement is rapidly effected with a displacement amount Q1, by adjusting the opening of the exhaust valve. The value of Q1 is usually set to about 5 l/min.

After the output correction is finished at time t6, the displacement amount is reduced to Q2, and this value is kept constant during the subsequent operation period. Since most unnecessary components introduced therein during the non-operating state are discharged between the times t5 and t6, the value of Q2 may be the minimum value that allows the laser gas deteriorated by the electric discharge during the operation to be replaced, and in practice, is set to less than one-tenth of Q1. The value of Q2 is usually set to about 0.5 l/min. Accordingly, the amount of the laser gas consumed during the whole operation period is reduced, compared with the conventional case, corresponding to the limitation of the displacement amount to Q2.

The aforesaid value of the displacement amount or the specific value of the laser gas pressure can be changed for each application, depending on the type or operating conditions of the gas laser device.

According to the present invention, as described above, the displacement amount of the laser gas is reduced, compared with the conventional case, except during the output correction period immediately after the starting of the gas laser device, so that the amount of consumption of the laser gas is reduced and the economical efficiency is improved.

Moreover, since the displacement is effected to a sufficient amount during the output correction period, the control characteristic of the laser output is not adversely affected, and the correction can be accurately performed immediately after starting.

We claim:

1. A laser gas displacement amount control method for controlling the displacement amount of laser gas in a discharge pumping type gas laser device, said laser gas displacement amount control method comprising displacing said laser gas by a predetermined displacement amount, which is set to a value sufficient to remove contaminants which have seeped into said laser gas, during a fixed period immediately after starting; effecting a beam-output correction during said fixed period before a beam is output from the laser device; and subsequently displacing said laser gas by a displacement amount smaller than said predetermined displacement amount during an operational period after said fixed period has lapsed.

2. A laser gas displacement amount control method according to claim 1, wherein the displacement amount control of said laser gas is effected by software in a single piping system as a sequential operation.

* * * * *

UNITED STATES PATENT AND TRADEMARK OFFICE
CERTIFICATE OF CORRECTION

PATENT NO. : 5,088,101
DATED : February 11, 1992
INVENTOR(S) : MICHIAKI IRIE, NOBUAKI IEHISA and ETSUO YAMAZAKI It is certified that error appears in the above-identified patent and that said Letters Patent is hereby corrected as shown below:

Column 1,    lines 40 and 41, "has been contrived in consideration of these circumstances, and" should be deleted;

line 42, "thereof is" should be deleted.

Column 4,    line 3, "1/min." should be --ℓ/min.--;

line 13, "1/min." should be --ℓ/min.--.

Signed and Sealed this

First Day of June, 1993

Attest:

MICHAEL K. KIRK

*Attesting Officer*    *Acting Commissioner of Patents and Trademarks*